No. 649,843. Patented May 15, 1900.
W. H. HONISS.
HERMETICALLY SEALED JAR.
(Application filed Aug. 17, 1899.)

(No Model.) 2 Sheets—Sheet 1.

Witnesses:
Jos. Merritt
H. Mallum

Inventor
W. H. Honiss

THE NORRIS PETERS CO., PHOTO-LITHO., WASHINGTON, D. C.

No. 649,843. Patented May 15, 1900.
W. H. HONISS.
HERMETICALLY SEALED JAR.
(Application filed Aug. 17, 1899.)

(No Model.) 2 Sheets—Sheet 2.

Witnesses:
Jos. Merritt.
H. Mallner

Inventor
W. H. Honiss

UNITED STATES PATENT OFFICE.

WILLIAM H. HONISS, OF HARTFORD, CONNECTICUT, ASSIGNOR OF THREE-FOURTHS TO WILLIAM A. LORENZ, OF SAME PLACE, AND BARTLETT ARKELL, OF CANAJOHARIE, NEW YORK.

HERMETICALLY-SEALED JAR.

SPECIFICATION forming part of Letters Patent No. 649,843, dated May 15, 1900.

Application filed August 17, 1899. Serial No. 727,596. (No model.)

*To all whom it may concern:*

Be it known that I, WILLIAM H. HONISS, a citizen of the United States of America, and a resident of Hartford, in the county of Hartford and State of Connecticut, have invented certain new and useful Improvements in Hermetically-Sealed Jars, of which the following is a specification.

This invention relates to improvements in hermetically-sealed jars or cans of the class most commonly employed for the preservation of food and of other materials which are liable to deterioration or decomposition by contact with air.

Figure 1:
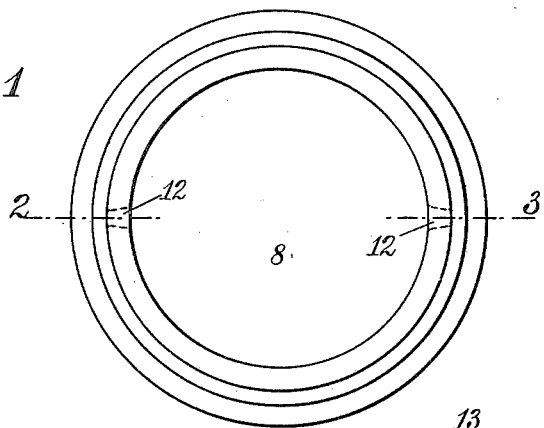
Figure 2:
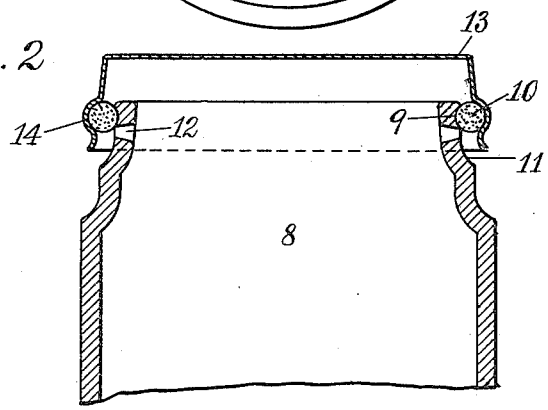
Figure 3:
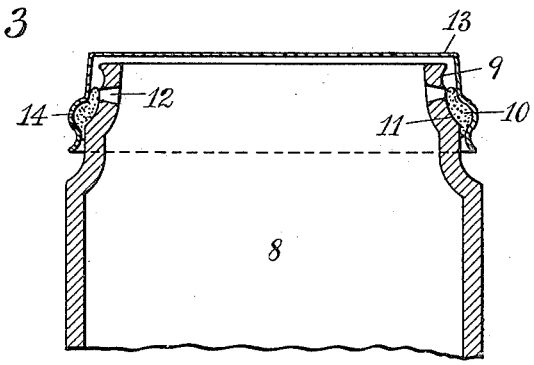
Figure 4:
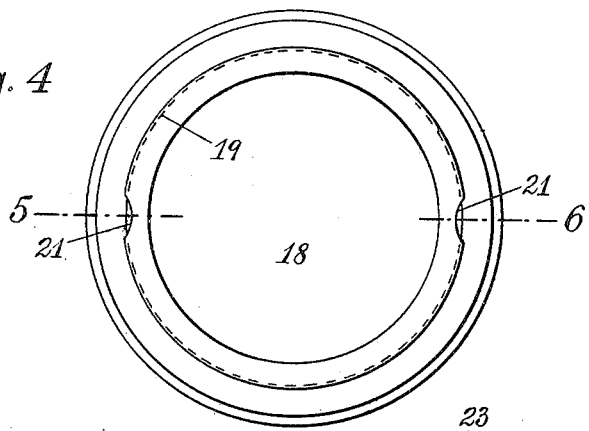
Figure 5:
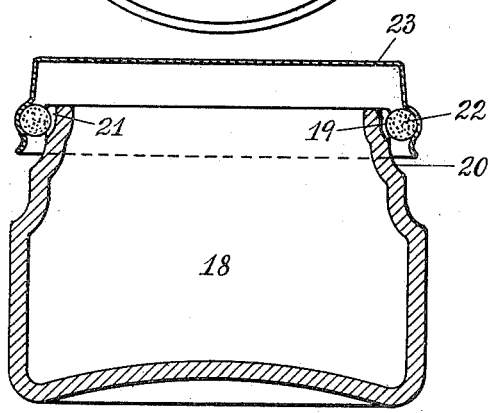
Figure 6:
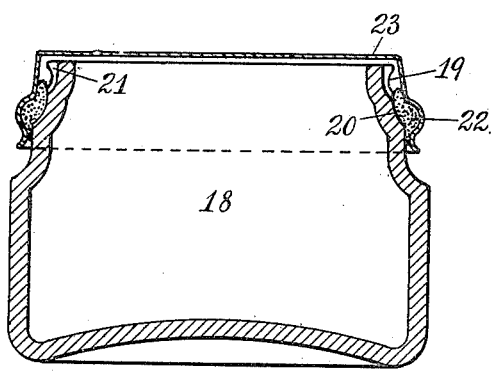

Figures 1, 2, and 3 of the drawings represent an embodiment of this invention in its simplest form. Fig. 1 is a plan view of the jar. Fig. 2 is a side view in section, taken on the line 2 2 of Fig. 1, of a jar and its gasket and cap, showing the latter in their expanding position or that occupied by them during the process of expelling or exhausting the air from the interior of the jar. Fig. 3 is a side view similar to that of Fig. 2, excepting that the cap and the gasket are here moved to their sealing position, with the gasket below the air-ducts. Figs. 4, 5, and 6 represent a modified form of this improved jar, in which the air-ducts are in the form of grooves in the neck of the jar, extending down past the seat occupied by the gasket when in its exhausting position. Fig. 4 is a plan view of the jar and the gasket, the latter being in the uncompressed position occupied by it in Fig. 5. Fig. 5 is a side view in section, taken on the line 5 6 of Fig. 4, showing the cap and gasket resting upon their highest or air-exhausting seat of the jar. Fig. 6 is a view similar to that of Fig. 5, excepting that the cap and the gasket are here shown in their sealing position upon the lower gasket-seat of the jar.

Jars of this class are ordinarily sealed by means of an annular gasket, of rubber or similar yielding material, which is seated in an annular groove extending around the neck of the jar, the gasket remaining permanently in this seat. To seal the jars, the gaskets are compressed by means of a metallic cap having a smooth flaring rim which is pressed down upon the outside of the gasket after the air within the jar has been expelled either by cooking the contents of the jar or by exhausting the air therefrom by an apparatus suited to this purpose. The external atmospheric pressure upon the cap is then sufficient to keep the gasket permanently compressed; but during the operation of sealing the jars spring-clamps and other pressing devices have hitherto been employed to hold the caps in contact with the gaskets, so as to prevent the caps from being displaced by handling or by the subsequent action of the air within the jar during its expulsion or exhaustion therefrom, as well as to prevent the readmission of the air to the interior of the jar at the completion of the exhausting operation and until the permanent external pressure takes place. The smooth surfaces of the metallic rim and of the jar-neck form unbroken belts of contact with the gasket, and thereby impede the escape of air from the interior of the jar past the gasket during the operation of expelling or exhausting the air, which therefore can only escape by lifting the cap from the gasket or by forcing its way between them. The spring-clamps above referred to resist this lifting action, the result being that at the conclusion of the exhausting operation the degree of vacuum within the jar is less than that outside by an extent proportional to and determined by the pressure of the spring-clamps. Furthermore, unless the pressure exerted by these clamps is exactly uniform around the circle of the rim the escaping air will lift that portion or side thereof which yields most readily, thus allowing the opposite side to be crowded further down, thereby tending to permanently tilt the cap. This tilting of the caps is objectionable both for appearance and for the more important reason that when sealed in this inclined position the ring or belt of contact between the circular gasket and the conical rim of the cap is not a circle, but is approximately an ellipse, which does not conform accurately to the circular form of the neck of the jar, and therefore does not compress the gasket uniformly at all portions thereof. The present invention obviates these difficulties and dispenses with the spring-clamps by providing the neck of the jar with two different seats for the gasket, the latter resting upon one of these seats during the exhausting operation and upon the other seat when finally sealed. The interval between these two seats is provided with one or more air-ducts which communicate with the interior of the jar either by extending through the wall of the jar or across and under the first or uppermost seat for the gasket, thereby allowing the air to pass freely out of the jar through the ducts during the exhausting operation. At the conclusion of that operation the cap is pressed down to the position shown in Figs. 3 and 6, so as to carry the gasket upon or below the air ducts to its second or sealing seat, which is of larger diameter than the first, so as to compress the gasket outwardly against its seat in the cap, which is thereafter retained in its sealing position by the external atmospheric pressure, as in the former practice.

The jar 8 of Figs. 1, 2, and 3, which otherwise may be of the usual form, is provided adjacent to its mouth with an annular seat 9 for the gasket 10 during the air expelling or exhausting operation, and it is thereby designated as the "exhausting-seat." The sealing-seat 11 is located below the exhausting-seat, and between these two seats is located an air-duct or a series of air-ducts 12, which in the embodiment of the invention shown in Figs. 1, 2, and 3 consist of perforations extending directly through the wall of the jar to the interior thereof. The necks of the jars herein shown are also employed as a means for compressing the gasket against the cap, and the sealing-seat is therefore of a suitably-enlarged diameter. The exhausting-seat 9 for use in connection with an uncompressed gasket should be depressed in the form of an annular groove extending around the neck of the jar, as herein shown, so as to confine the uncompressed gasket to its seat during the exhausting operation and also to insure that it shall occupy a level position with relation to the jar, or, in other words, to locate the gasket in a plane substantially at right angles to the longitudinal center of the jar. The cap 13, which is preferably of metal, is provided with an annular seat 14 for locating the cap upon the gasket, the seat underlying the lower side of the gasket and forming a substantially-continuous shoulder to prevent inadvertent upward displacement and overlying the upper side of the gasket far enough to insure that the latter shall be positively carried with the cap from the exhausting-seat 9 to the sealing-seat 11 when the cap is pressed down from the position of Fig. 2 to that of Fig. 3.

In the modified embodiment of this invention shown in Figs. 4, 5, and 6 the jar 18 is provided with the exhausting-seat 19 and the sealing-seat 20, similar in form and location to the corresponding seats 9 and 11 of the jars 8 of Figs. 1, 2, and 3. In this modification, however, the air-ducts 21 consist of one or more grooves which extend beneath and across the exhausting-seat 19 from the space between the two seats 19 and 20, thereby forming free passages for the air from the interior of the jar past the gasket when the latter is upon its exhausting-seat, as shown in Fig. 5. The gasket 22 and the cap 23 employed with this form of air-duct may obviously be, as herein shown, exactly like those of Figs. 2 and 3.

The air-ducts and the seats for the gaskets may be formed when the jar is molded without any additional labor or expense over that attending the manufacture of the present forms of glass jars. In the case of cans made of sheet metal the ducts may be formed by corrugating the neck of the jar inwardly at the desired points.

When, as herein shown, the exterior surface of the neck of the jar is also employed for the purpose of compressing the gasket, it is usually necessary for the accomplishment of this function alone to carry the gasket entirely below the air-duct. This, however, is not necessary for the performance of the separable function of sealing the ducts themselves, since it will be ordinarily sufficient for the latter purpose alone considered to carry the compressed gasket upon the ducts far enough to cover and seal their outer ends—in other words, having regard merely to the location and operation of the ducts themselves it is only essential that they shall allow free communication between the interior of the jar and the external atmosphere, either below or past the gasket during the exhausting operation, and shall be completely sealed so as to shut off that communication at the conclusion of that operation. Obviously therefore it is immaterial, so far as the function of the ducts is concerned, and aside from the specific construction herein shown, whether the gaskets are compressed by means of the jar, as herein shown, or even whether they are compressed simultaneously with the sealing of the ducts, since the specific applications of this invention may be varied and extended in many ways.

A single duct if of sufficient size and suitably located will be ordinarily sufficient for each jar; but in order to allow for the contingency of a single duct being sealed during the exhausting operation by misplacement of the cap or for the possibility of its becoming stopped or clogged by the contents of the jar or by foreign substances it is considered preferable to provide each cap with two or more of these ducts and to space them at substantially equal intervals around the jar. The area of the opening of these ducts should be sufficient to allow of the free escape of the air from the jar, so as to avoid internal pressure upon the cap tending to dislocate or dislodge it.

This invention is equally applicable to those forms of jars in which the cap and its gasket are seated upon the interior of the mouth of the jar instead of its exterior, as herein shown, such a construction involving merely a reversal of the features of this invention.

I claim as my invention—

1. A jar provided with a plurality of seats for a single gasket and having an air-duct extending from a space between two of the gasket-seats for communicating with the interior of the jar, and a cap for compressing the gasket.

2. A jar, provided with an exhausting-seat and with a larger sealing-seat, for the same gasket, and having an air-duct for communicating between the interior of the jar and the external atmosphere between the gasket-seats, and a cap for compressing the gasket.

3. In combination with a jar provided with an exhausting-seat and with a larger sealing-seat for the gasket, and having one or more air-ducts for communicating between the interior of the jar and the external atmosphere between the gasket-seats, a cap having a seat for receiving the gasket and for moving it positively from one to the other of the gasket-seats upon the jar.

4. In combination with a jar provided with a seat for receiving and leveling a gasket during the exhausting operation, having a larger sealing-seat for the gasket, and having an air-duct for communicating between the interior of the jar and the external atmosphere between the gasket-seats, a cap, having a seat for receiving the gasket and for moving it positively from one to the other of its seats upon the jar across the air-duct.

Signed by me at Hartford, Connecticut, this 15th day of August, 1899.

WILLIAM H. HONISS.

Witnesses:
JENNIE NELLIS CASE,
JOS. MERRITT.